(12) United States Patent
Marcotegui Goni

(10) Patent No.: US 8,210,094 B2
(45) Date of Patent: Jul. 3, 2012

(54) COFFEE DOSING DEVICE

(75) Inventor: Jose Angel Marcotegui Goni, Peralta (ES)

(73) Assignee: Quality Espresso, S.A., Barcelona (ES)

( * ) Notice: Subject to any disclaimer, the term of this patent is extended or adjusted under 35 U.S.C. 154(b) by 647 days.

(21) Appl. No.: 12/373,186

(22) PCT Filed: Jul. 12, 2007

(86) PCT No.: PCT/ES2007/000421
§ 371 (c)(1),
(2), (4) Date: Jan. 9, 2009

(87) PCT Pub. No.: WO2008/006924
PCT Pub. Date: Jan. 17, 2008

(65) Prior Publication Data
US 2009/0255409 A1  Oct. 15, 2009

(30) Foreign Application Priority Data
Jul. 12, 2006  (ES) .................................. 200601856

(51) Int. Cl.
*A47J 31/42* (2006.01)
*A47J 42/40* (2006.01)
(52) U.S. Cl. .......... 99/286; 193/31 A; 222/450; 241/100
(58) Field of Classification Search .................... 99/286; 141/248; 193/20, 21, 31 R, 31 A; 222/278, 222/279, 431, 450, 254; 241/100; *A47J 31/42, A47J 42/40, 42/42*
See application file for complete search history.

(56) References Cited

U.S. PATENT DOCUMENTS

| 1,736,460 | A | * | 11/1929 | Enrico et al. | 99/286 |
| 2,014,325 | A | * | 9/1935 | Grilli | 99/286 |
| 2,094,548 | A | * | 9/1937 | Meeker | 241/100 |
| 3,153,377 | A | * | 10/1964 | Bosak | 99/286 |
| 3,190,509 | A | * | 6/1965 | Kirchhoefer | 222/450 |
| 3,482,714 | A | * | 12/1969 | Oguri et al. | 222/450 |
| 3,747,986 | A | * | 7/1973 | Boon | 222/450 |
| 3,788,368 | A | * | 1/1974 | Geng et al. | 222/450 |
| 3,921,865 | A | * | 11/1975 | Klug | 222/450 |
| 4,008,740 | A | * | 2/1977 | Chermack | 141/100 |
| 5,158,793 | A |   | 10/1992 | Helbling |  |
| 5,193,438 | A |   | 3/1993 | Courtois |  |
| 5,381,969 | A | * | 1/1995 | Paulig | 241/100 |
| 5,462,236 | A | * | 10/1995 | Knepler | 241/100 |

(Continued)

FOREIGN PATENT DOCUMENTS
DE    486 625    11/1929
(Continued)

OTHER PUBLICATIONS
Machine Translation of JP 2003-144326, retrieved from http://www4.ipdl.inpit.go.jp/Tokujitu/tjsogodbenk.ipdl, Aug. 16, 2011, 11 pages.*
(Continued)

*Primary Examiner* — Stephen F Gerrity
(74) *Attorney, Agent, or Firm* — Katen Muchin Rosenman LLP

(57) ABSTRACT

The invention relates to a coffee dosing device comprising a ground coffee receiving chamber (1), provided with a passage hatch (8) leading to outlet conduits (6-7). Each of these outlet conduits includes a lower outlet hatch (10-11) and an intermediate hatch (23-24) which, in their closed positions, define two ground coffee storage chambers.

18 Claims, 3 Drawing Sheets

U.S. PATENT DOCUMENTS 5,542,583 A * 8/1996 Boyer et al. .................. 222/450
5,850,859 A * 12/1998 Ciaurriz Andueza .......... 99/291

FOREIGN PATENT DOCUMENTS

| | | |
|---|---|---|
| EP | 0 082 947 | 7/1983 |
| EP | 0 424 326 | 4/1991 |
| EP | 0 434 612 | 6/1991 |
| EP | 0 452 214 | 10/1991 |
| EP | 0 818 170 | 1/1998 |
| EP | 1174065 A1 * | 1/2002 |
| ES | 2212683 A1 * | 7/2004 |
| JP | 2002191507 A * | 7/2002 |
| JP | 2003144326 A * | 5/2003 |
| WO | WO 2005004685 A1 * | 1/2005 |

OTHER PUBLICATIONS

International Search Report dated Nov. 22, 2007, from the corresponding International Application, PCT/ES2007/000421, 3 pages.

* cited by examiner

COFFEE DOSING DEVICE

FIELD OF THE INVENTION

The present invention relates to a coffee dosing device comprising a ground coffee receiving chamber, provided with a passage hatch leading to outlet conduits, each of which has an outlet hatch. Patent ES 2137811 of the same proprietors as the present application describes a coffee dosing device which can be coupled to a coffee grinder. This device includes an upper chamber which is communicated with the outlet of the grinder and is forked at the lower part in two conduits. A hatch is arranged in coincidence with the mentioned fork which allows diverting the ground coffee to either conduit according to its position. These two conduits have at their lower end passage hatches which allow, when they are closed, storing ground coffee, whereas upon being opened they allow the fall or exit of the coffee to be deposited for example in a receptacle of those used to make an espresso coffee. This arrangement allows having two ground coffee stores, each of them provided with an outlet hatch, being able to give different doses for one or two coffees. In this patent the hatches consist of horizontal trap doors which, actuated by an electromagnet, are moved in a horizontal direction to allow the coffee to fall into both conduits. Main patent 200002205, with publication number 2212683, describes a device similar to that previously mentioned, but using trap doors actuated by independent electric motors as outlet hatches of both conduits and as a door of the fork, the three hatches pivoting on shafts which are connected by means of corresponding transmissions with the respective motors.

DESCRIPTION OF THE INVENTION

The object of the present invention is several improvements introduced in the device object of patent 200002205, for the purpose of increasing the dose capacity of the outlet conduits, such that up to four different doses can be stored and supplied. The device object of patent 200002205 includes an upper ground coffee receiving chamber which is communicated with the outlet of the grinder, which chamber is provided with a passage hatch leading to outlet conduits having an outlet hatch, such that when these hatches are closed they can store the doses of one or two coffees and dose them by opening the corresponding hatch when it is thus requested. This arrangement allows having two ground coffee stores, one in each outlet conduit, a possible arrangement being one in which in one of the conduits the dose is that necessary to make one coffee, whereas the other one contains the ideal dose to make two coffees. The object of the present invention is to increase the aforementioned capacity, for which each of the vertical conduits is subdivided into two compartments by means of adding an intermediate hatch in each conduit, similar to that arranged in the mouth thereof, such that two different doses can be stored in each outlet conduit. In other words, the outlet conduits will include, between the passage hatch of the receiving chamber and the outlet hatch of each conduit, an intermediate hatch which, in its closed position, defines an intermediate chamber for storing ground coffee. This intermediate hatch, as well as the passage hatch of the upper chamber and the outlet hatch of the conduits, will be actuated by as many other independent motors, as described in the main patent. With this arrangement it is possible to store in one of the tubes and in the lower part the dose of one coffee and in the upper part the dose which added to the lower one is the ideal dose for two coffees. The dose of one and two weak coffees and the dose for a holder of three coffees or any other desired combination can be stored in the other conduit. In this way, with the two outlet conduits there are four storage chambers which, filled with their corresponding doses, will allow, if desired, the dose of one coffee, for which the dose holder receptacle of one coffee will be placed under the chamber and upon pressing the corresponding micro or the like the lower trap door of the corresponding conduit is opened, the dose of one coffee falling by gravity to the holder. Thereafter the outlet hatch is closed. To replace the ground coffee in the chambers defined in the conduits, the upper passage hatch is placed in the suitable position, the dose of coffee necessary to make the dose stored in the upper chamber be equal to the desired dose of the lower one is then ground, and by means of the corresponding opening and closing of hatches, the dose of one coffee is deposited in the lower chamber. The corresponding dose is subsequently ground on the hatch of the first chamber, leaving the programmed doses of coffee for both chambers. If the dose of two coffees is to be obtained, upon placing the receptacle under one of the outlet conduits and pressing the corresponding micro or the like, the trap doors of the two storage chambers of this conduit are opened to obtain the dose of two coffees in the holder. Thereafter, the lower outlet hatch is closed and the dose of one coffee is ground. The intermediate hatch is then closed and the corresponding dose of the upper chamber defined by this hatch is ground. The chambers will be filled by actuating the motor of the grinder and grinding an amount of coffee equal to the previously programmed amount. To carry out this control of the amount to be dosed, the motor of the grinder can be controlled in a timed manner or by measuring the volume stored in each chamber by means of photocells or other sensors. The combination of several of these systems can also be used, always keeping in mind that when the receptacle with the corresponding dose of coffee is removed, automatically and by means of the suitable means, the motor of the grinder starts operating in order to grind an amount of coffee equal to the previously extracted dose, all of these actions being previously programmed. It can also be programmed to serve only single or double coffees stored in a single chamber, always leaving the upper trap door open. To obtain the dose, the presence of the filter holder is detected by pressing a micro or another detection means. To determine whether the desired dose is that of the lower chamber or that of the two chambers of a conduit, different systems can be used, such as manually pressing a key (to obtain the dose of two coffees) before introducing the filter holder, making a double clip in the micro, placing different proximity detectors in the holder of one coffee and in the holder of two coffees, etc.

As an implementation variant two independent motors can be arranged in the grinder, one for each vertical outlet conduit, such that coffee grains of different origins can be ground. This variant dispenses with the passage hatch of the ground coffee receiving chamber and the outlet of each motor goes directly to the upper storage chamber of the corresponding conduit. In this version the grinder can supply the dose of one or two coffees of each type of coffee.

Another implementation variant consists of providing the grinder with a single vertical conduit and a coffee grinder with its corresponding motor. The outlet conduit will have the lower outlet hatch and the intermediate hatch, such that it delimits two superimposed chambers, as has been described above.

BRIEF DESCRIPTION OF THE DRAWINGS

The features of the coffee dosing device according to the improvements of the invention will be better understood with the following description, made with reference to the attached drawings, in which a non-limiting embodiment is shown:

In the drawings:

The dosing device shown in FIGS. 1 and 2 comprises an upper chamber 1 with a side opening 2 through which it is connected to the outlet 3 of a coffee grinder 4 actuated by means of the motor 5. Two approximately vertical conduits referenced with numbers 6 and 7 emerge from the chamber 1 at the lower part. A passage hatch 8 is arranged in the outlet of the chamber 1, which hatch can pivot on the horizontal shaft 9 between two end positions in which the passage from the chamber 1 leading to either of the conduits 6 or 7 is closed. The mentioned vertical conduits have assembled in their mouth respective outlet hatches 10 and 11, pivoting on horizontal shafts 12 and 13 between closed 10' and open 10" positions, as shown in FIG. 2. The passage hatch 8 is actuated by means of an electric motor 14, for example through a transmission which can be made up of pulleys 15 and 16 and transmission belts 17. The outlet hatches 10 and 11 are in turn actuated from as many other independent electric motors, of which only the motor responsible for actuating the hatch 10, referenced with number 18, is depicted in FIG. 2. These hatches can also be actuated by means of transmissions of pulleys 19 and 20 and belt 21. The device shown in FIG. 3 corresponds in its general makeup to that described with reference to FIGS. 1 and 2, the same references being used to designate coinciding parts or elements. The device of FIGS. 3 and 4 includes, as an improvement with respect to the device of FIGS. 1 and 2, an intermediate hatch 23 in the conduit 6 and an intermediate hatch 24 in the conduit 7, located in both cases between the passage hatch 8 of the upper chamber 1 and the lower outlet hatch 10 or 11 of the conduits 6 and 7. With this arrangement, two chambers are created in each of the conduits 6 or 7, an upper chamber, which is referenced with numbers 25 and 26, respectively, located on the intermediate hatches 23 and 24, and another lower chamber, referenced with numbers 27 and 28, located on the hatches 10 and 11. Each of the hatches of the device, including the passage hatch 8, the intermediate hatches 23 and 24 and the lower hatches 10 and 11, is actuated by an independent motor. The hatch 8 is actuated by the motor 14, the lower hatches 10 and 11 are actuated by motors 18 and the intermediate hatches 23 and 24 are likewise each actuated by an independent motor 30, of which only that actuating the hatch 23 is depicted in FIG. 4. In other words, in the device of the invention the actuation of each hatch is maintained by an independent motor, as in the main patent, but an intermediate hatch is included in each of the outlet conduits, which allows having the previously mentioned combinations for the supply of coffee, for the purpose of obtaining different types of infusions. In the device of FIGS. 3 and 4 there is only one coffee receiving chamber 1, which coffee comes from a single grinder. As a variant, as shown schematically in FIG. 5, the device can include two independent coffee receiving chambers 1, which coffee comes from as many other also independent grinders 31, which can contain for example a different type of coffee. A single conduit 32 emerges from each of the chambers 1, which allows eliminating the passage hatch of the chamber 1. Each conduit 32 will have a lower outlet hatch 33, equivalent to the hatches 10 and 11 of the device of FIG. 3, and an intermediate hatch 34, equivalent to the hatches 23 and 24 of the device of FIG. 3. These hatches 33 and 34 will be actuated by independent motors. Finally, FIG. 6 shows a grinder including a single coffee receiving chamber 1, which coffee comes from a grinder 31, from which chamber there emerges a single outlet conduit 32, having the lower outlet hatch 33 and the intermediate hatch 34. The passage hatch located at the outlet of the chamber 1 is also dispensed with, since as in the case of FIG. 5 the coffee of the chamber 1 will always be directed towards the same outlet conduit.

Figures 1, 2:
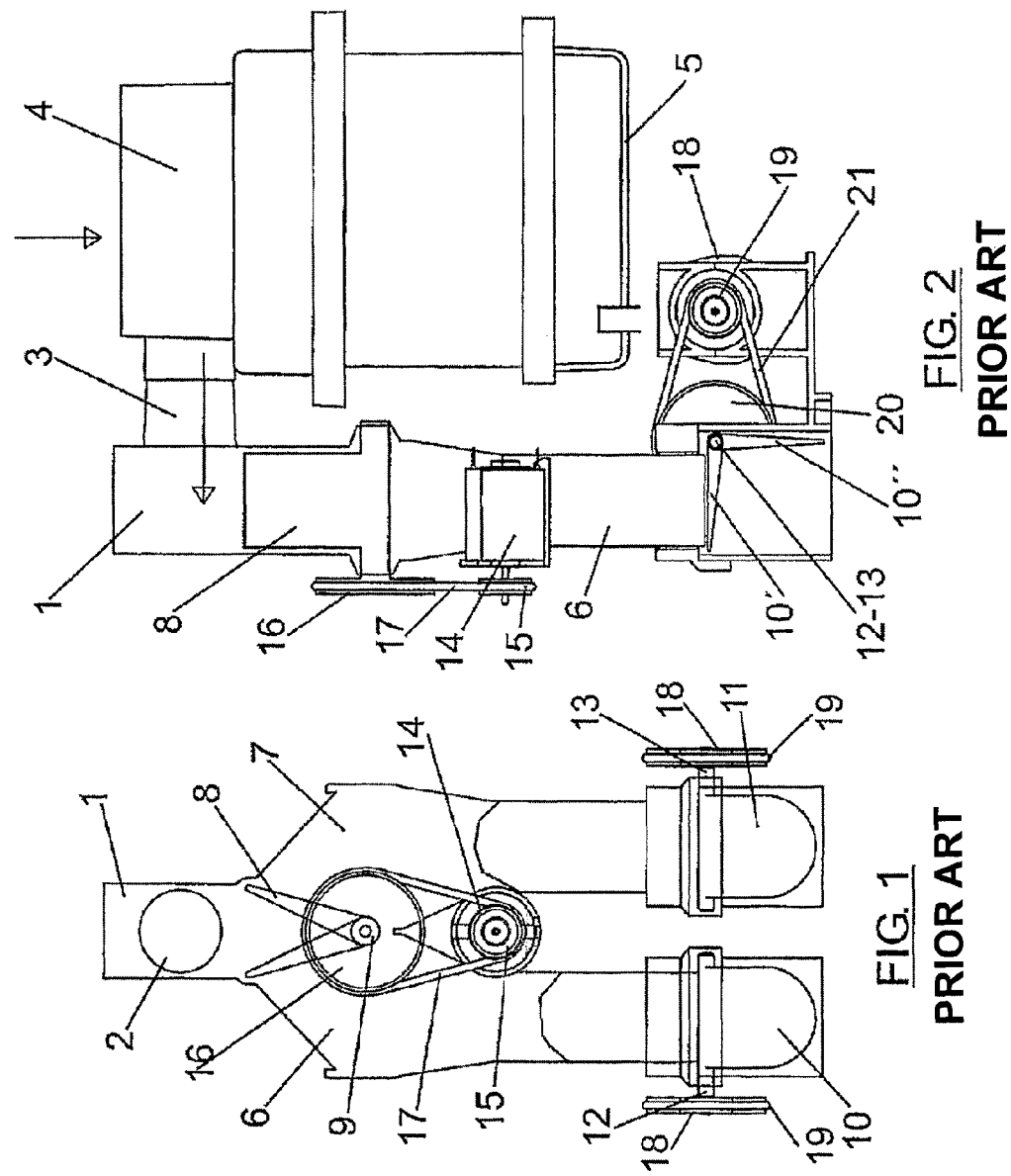
FIG. 1 shows a front elevational view of the device of the state of the art object of patent ES 2212683.
FIG. 2 is side elevational view of the grinder of FIG. 1.
Figure 4:
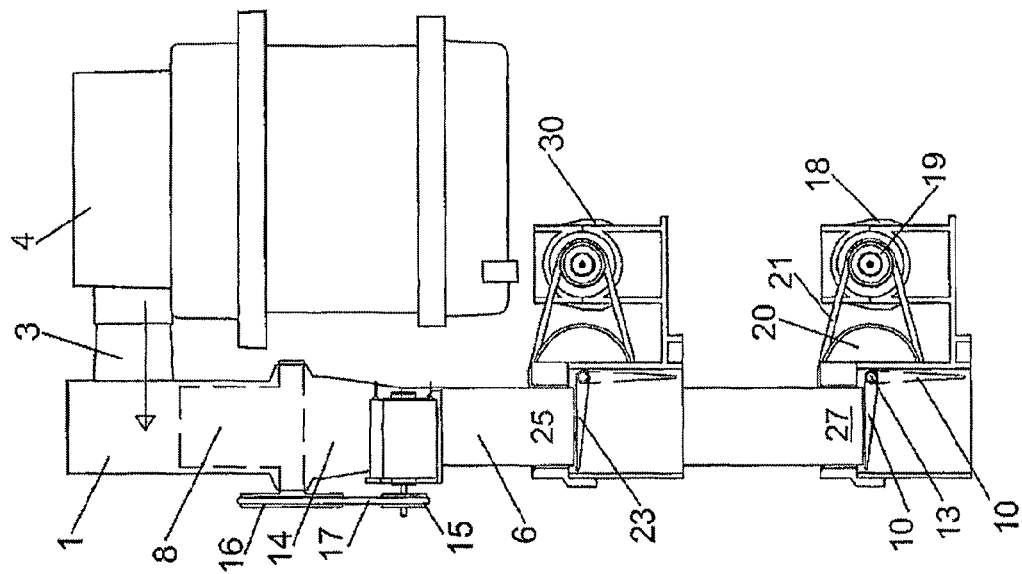
FIG. 4 is side elevational view of the device of FIG. 3.
Figure 3:
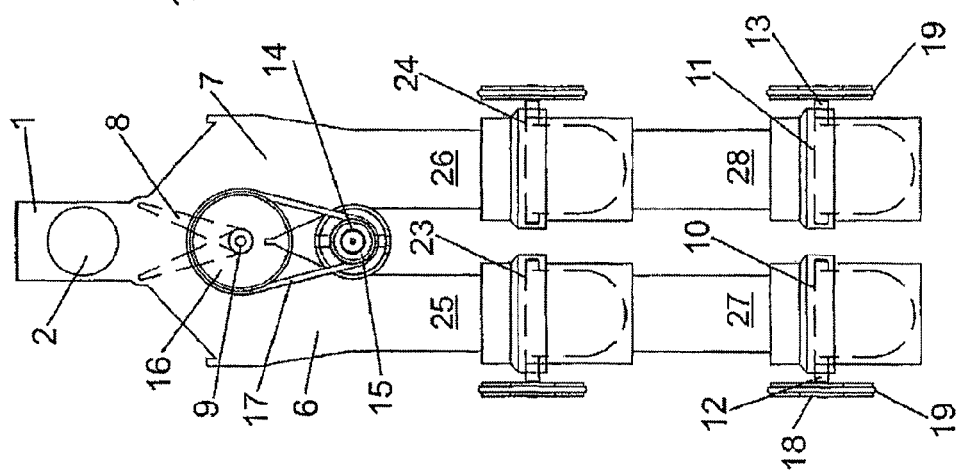
FIG. 3 is a view similar to FIG. 1, including the improvements of the invention.
Figure 5:
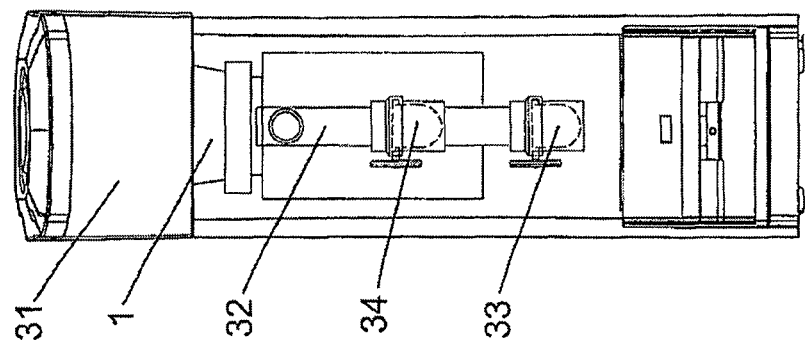
FIGS. 5 and 6 are views similar to FIG. 3, showing as many other implementation variants.
Figure 6:
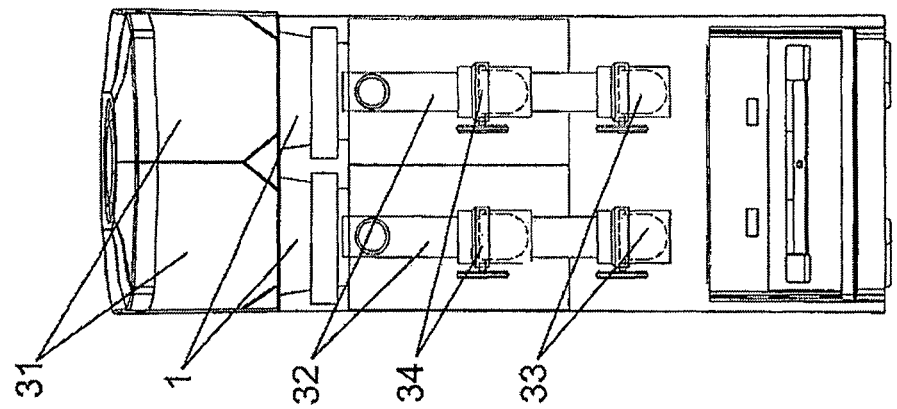

The invention claimed is:

1. A coffee dosing device for ground coffee, the device comprising:
   a receiving chamber for receiving the ground coffee;
   a plurality of outlet conduits, each outlet conduit comprising one entrance and one exit, the receiving chamber being connected directly to the entrances of each outlet conduit, each outlet conduit conducting the ground coffee from the respective entrance to the respective exit of the outlet conduit;
   a passage hatch directing the ground coffee from the receiving chamber into an entrance of one outlet conduit while preventing the ground coffee from entering the respective entrances of other outlet conduits;
   a plurality of intermediate hatches and a plurality of outlet hatches,
      each outlet conduit comprising one intermediate hatch and one outlet hatch, the one outlet hatch being disposed more proximal to the exit than the one intermediate hatch,
      each of the plurality of intermediate hatches and each of the plurality of outlet hatches being independently movable from a closed position storing the ground coffee in the outlet conduit proximal to the respective hatch to an open position releasing the ground toward the exit;
   wherein the intermediate hatch and the outlet hatch of the same outlet conduit are actuated by at least one actuating motor to temporarily store the ground coffee and release the stored ground coffee in a predetermined manner.

2. The device of claim 1, wherein each intermediate hatch is pivotably movable.

3. The device of claim 2, wherein each outlet hatch is pivotably movable.

4. The device of claim 3, wherein the passage hatch is pivotable.

5. The device of claim 1, further comprising a plurality of actuating motors, wherein each of the plurality of intermediate hatches and each of the plurality of outlet hatches is associated with a respective actuating motor.

6. The device of claim 5, wherein the passage hatch is associated with a respective actuating motor.

7. The device of claim 1, further comprising a grinder connected via an outlet directly to the receiving chamber.

8. A coffee dosing device for ground coffee, the device comprising:
   receiving chamber for receiving the ground coffee;
   a plurality of outlet conduits, each outlet conduit directly connected to the receiving chamber, each outlet conduit conducting the ground coffee from the receiving chamber to an exit of the respective outlet conduit;
   a passage hatch selectively directing the ground coffee from the receiving chamber into one of the plurality of outlet conduits while preventing the ground coffee from entering the respective entrances of other outlet conduits;

each outlet conduit comprising a first hatch and a second hatch, each first hatch and each second hatch being independent movable from a closed position storing a predetermined amount of the ground coffee to an open position releasing the predetermined amount of the ground coffee;

wherein when in one outlet conduit the second hatch is in the open position and the first hatch is moved to the open position the predetermined amount of the ground coffee stored by first hatch is conducted to the exit of the respective outlet conduit.

9. The device of claim 8, wherein when in one outlet conduit the first hatch is in the open position and the second hatch is in the closed position the predetermined amount of ground coffee is stored.

10. The device of claim 8, wherein each of the first hatch is pivotably movable.

11. The device of claim 10, wherein each of the second hatch is pivotably movable.

12. The device of claim 11, further comprising a plurality of motors, each motor associated with one of the first hatches or one of the second hatches.

13. The device of claim 8, further comprising a grinder connected via an outlet directly to the receiving chamber.

14. A coffee dosing device for ground coffee, the device comprising:

a receiving chamber for receiving the ground coffee;

a first outlet conduit and a second outlet conduit, each outlet conduit directly connected to the receiving chamber, each outlet conduit conducting the ground coffee from the receiving chamber to an exit of the respective outlet conduit;

a passage hatch selectably directing the ground coffee to one of the outlet conduits;

each outlet conduit comprising a first hatch and a second hatch disposed in sequence in the outlet conduit, each first hatch and each second hatch being independent movable from a closed position storing a predetermined amount of the ground coffee to an open position releasing the predetermined amount of the ground coffee.

15. The device of claim 14, wherein each of the first hatch is pivotably movable.

16. The device of claim 15, wherein each of the second hatch is pivotably movable.

17. The device of claim 16, further comprising a plurality of motors, each motor associated with one of the first hatches or one of the second hatches.

18. The device of claim 14, further comprising a grinder connected via an outlet directly to the receiving chamber.

* * * * *